United States Patent [19]

Krohn et al.

[11] Patent Number: 4,849,891

[45] Date of Patent: Jul. 18, 1989

[54] DEVICE FOR PROPULSION CONTROL FOR A MOTOR VEHICLE WITH ALL-WHEEL DRIVE

[75] Inventors: Hellmut Krohn, Esslingen; Jürgen Frank, Reichenbach, both of Fed. Rep. of Germany

[73] Assignee: Daimler-Benz Aktiengesellschaft, Stuttgart, Fed. Rep. of Germany

[21] Appl. No.: 35,854

[22] Filed: Apr. 8, 1987

[30] Foreign Application Priority Data

Apr. 11, 1986 [DE] Fed. Rep. of Germany ....... 3612170

[51] Int. Cl.$^4$ .............................................. B60T 8/32
[52] U.S. Cl. .......................... 364/426.03; 364/426.01;
180/197; 303/97; 303/100; 361/238
[58] Field of Search ...................... 364/420.01, 420.03;
303/95, 97, 100, 111; 361/238; 180/197

[56] References Cited

U.S. PATENT DOCUMENTS

| 3,950,036 | 4/1976 | Fink et al. ........................ 303/21 BE |
| 4,484,280 | 11/1984 | Brugger et al. ....................... 303/96 |
| 4,589,511 | 5/1986 | Leiber ................................. 303/100 |
| 4,715,662 | 12/1987 | Van Zanten et al. ................ 364/426 |
| 4,736,994 | 4/1988 | Fennel et al. ......................... 364/426 |
| 4,750,125 | 6/1988 | Leppek et al. ....................... 361/238 |
| 4,763,262 | 8/1988 | Leiber ................................. 364/426 |
| 4,763,263 | 8/1988 | Leiber ................................. 364/426 |
| 4,765,430 | 8/1988 | Schulze et al. ....................... 303/97 |

Primary Examiner—Parshotam S. Lall
Assistant Examiner—V. N. Trans
Attorney, Agent, or Firm—Barnes & Thornburg

[57] ABSTRACT

A propulsion control device for a motor vehicle which has a permanently balanced all-wheel drive, wherein the drive slip thresholds at which the control responds in the sense of a braking action, is increased as a function of the velocity and decreased as a function of the transverse acceleration. The acceleration thresholds, at which the control responds, are lowered as a function of the transverse acceleration. In the case of travel in a straight line, the lowest of the wheel peripheral velocities is taken as the reference velocity relative to which the drive slip thresholds are fixed. In the case of travel in a curve, the average of the wheel peripheral velocities of the left-hand side and right-hand side vehicle wheels is taken as the reference velocity for the vehicle wheels on the left-hand side and the right-hand side of the vehicle, respectively. From the time $t_0$ at which the control at one of the vehicle wheels comes into operation, the velocity of this vehicle wheel is updated in accordance with the expression $$v_{RT} = v_R(t_0) + r_0 \int^{TR} b \cdot dt$$

and, at this value, is taken into account in the formation of the reference velocities. The vehicle longitudinal acceleration b is continuously determined by means of a longitudinal acceleration sensor. In order to achieve optimum driving stability, additional control signals for the initiation of a torque reducing action in the drive unit of the vehicle are generated by analyzing the output signals of a transverse acceleration sensor, a curved travel sensor and the longitudinal acceleration sensor.

19 Claims, 4 Drawing Sheets

DEVICE FOR PROPULSION CONTROL FOR A MOTOR VEHICLE WITH ALL-WHEEL DRIVE

BACKGROUND AND SUMMARY OF THE INVENTION

The invention concerns a device for propulsion control of an all-wheel drive vehicle. The device operates on the principle of keeping a vehicle wheel tending to spin within a range of values of propulsion slip compatible with both good propulsion acceleration and good driving stability by activating its wheel brake and, if all the vehicle wheels tend to spin, by initiating a torque reducing action in the drive unit of the vehicle.

A propulsion control device of this type is the subject of commonly assigned U.S. patent application Ser. No. 943,783 filed Dec. 19, 1986.

In this propulsion control device, the reference velocity $v_{Ref}$ (comparison of which with the wheel peripheral velocities $v_R$ of the vehicle wheels to be controlled makes it possible to recognize that propulsion slip thresholds have been exceeded) is determined from the wheel peripheral velocities of the front wheels of the vehicle. As long as these are not driven (in the case where the vehicle is provided with a permanent rear axle drive and a front axle drive which can be automatically switched on), their peripheral velocities can be used directly as the reference velocities for the left-hand and the right-hand sides of the vehicle. If the front wheel drive is switched on or if, in the case of a vehicle with permananet all-wheel drive, it is continually effective, the reference velocities are determined from low pass filtering by integration elements of the front wheel velocities. The filter time constants are continually changed as a function of the integration value of the vehicle longitudinal acceleration, which is itself in turn compared with the vehicle longitudinal acceleration, in such a way that the filter time constants are decreased with increasing vehicle longitudinal acceleration and the filter time constants are increased with decreasing vehicle longitudinal acceleration. The intention of this is that the reference velocity should follow the particular front wheel velocity considered "more rapidly" when the vehicle is powerfully accelerated than it does if the vehicle is only weakly accelerated when it must, in consequence, be assumed that the front wheels also enter a state of increased drive slip.

The propulsion control device in accordance with the older patent application operates quite satisfactorily if the vehicle is provided with an automatic all-wheel drive, with the meaning explained above, or with a permanent all-wheel drive which provides a fixed torque distribution between the rear and front axles in such a way that the major proportion of the drive torque is transmitted via the rear axle. In both cases, however, a complex drive train is necessary. Another disadvantage of this propulsion control device is that the reference velocity determined from the processing by integration of the front wheel velocities is only a very inaccurate measure of the vehicle velocity. Thus, in order to ensure sufficient driving stability, the slip thresholds at which the control is activated have to be set relatively low and consequently it is necessary to sacrifice a substantial amount of otherwise usable propulsion acceleration.

The objective of the invention is therefore to produce a propulsion control device of the type mentioned above which, without sacrificing driving stability, makes possible improved utilization of the motor output torque for propulsion acceleration and, including the drive train of the vehicle, can be effected with less technical complexity.

This objective is achieved in accordance with the invention by a propulsion control device for a motor vehicle which has a permanently balanced all-wheel drive, wherein the drive slip thresholds at which the control responds in the sense of a braking action, is increased as a function of the velocity and decreased as a function of the transverse acceleration. The acceleration thresholds, at which the control responds, are lowered as a function of the transverse acceleration. In the case of travel in a straight line, the lowest of the wheel peripheral velocities is taken as the reference velocity relative to which the drive slip thresholds are fixed. In the case of travel in a curve, the average of the wheel peripheral velocities of the left-hand side and right-hand side vehicle wheels is taken as the reference velocity for the vehicle wheels on the left-hand side and the right-hand side of the vehicle, respectively. From the time $t_0$ at which the control at one of the vehicle wheels comes into operation, the velocity of this vehicle wheel is updated in accordance with the expression $$v_{RT} = v_R(t_0) + \int_{t_0}^{T_R} b \cdot dt$$

and, at this value, is taken into account in the the formation of the reference velocities. The vehicle longitudinal acceleration b is continuously determined by means of a longitudinal acceleration sensor. In order to achieve optimum driving stability, additional control signals for the initiation of a torque reducing action in the drive unit of the vehicle are generated by analyzing the output signals of a transverse acceleration sensor, a curved travel sensor and the longitudinal acceleration sensor.

The subsequently provided manner of formation of the reference velocities up to the point where the control system responds, the updating of the wheel peripheral velocity after the control system responds, as the integral value of the vehicle longitudinal acceleration, the modification of the slip and threshold values as a function of the velocity and the transverse acceleration (the control system responding when these threshold values are exceeded) and the design of the drive train as a permanently balanced all-wheel drive achieves a propulsion control system using the simplest technical means. The control system provides optimum propulsion acceleration and, at the same time, guarantees adequate driving stability for the largest possible number of conceivable driving situations.

The slip thresholds, which determine when the control system responds and whose utilization supports driving stability, can be modified either alternatives or can be effected in combination as a function of velocity and/or curved path or transverse acceleration.

Similarly, the acceleration thresholds at which the control system responds can be modified as a function of the velocity or transverse acceleration.

A torque reducing action in the drive unit of the vehicle is initiated by the drive control device according to the invention whenever the control becomes simultaneously effective in the sense of a braking action on all the vehicle wheels, whether this occurs because the drive slip thresholds are exceeded or because the acceleration thresholds are exceeded.

Additional criteria for initiation of a torque reducing action in the drive unit of the motor vehicle, and whose observation gives a further improvement in driving stability, are provided. These include whenever and as long as the required value of a transverse acceleration $a_s$ determined from the vehicle velocity and the magnitude of the steering handle Lw is greater by a specified threshold value $a_{s1}$ than the instantaneous value of the transverse acceleration a determined by the transverse acceleration sensor. During the course of travel in a curve, the second differential coefficient with respect to time $\ddot{a} = d^2a/dt^2$ of the instantaneous value transverse acceleration a is smaller than zero and is generated for at least as long as the signal characteristic of $\ddot{a} < 0$ is present. In association with these, are criteria which permit early reuse of good propulsion acceleration, without adversely affecting the driving stability. These include a device which terminates the control signal causing the torque reducing action in the drive unit if, after the signal characteristic of $\ddot{a} < 0$ has fallen off, the signal characteristic of $\ddot{a} < 0$ reappears. Also the device terminates the control signal causing the torque reducing action in the drive unit of the vehicle 12 if, after the control system comes into action, the acceleration value $a(t_0)$ occurring when it comes into action is again exceeded by the instantaneous transverse acceleration a acting on the vehicle.

Simple arrangements of logic circuits are provided, which individually or in combination can be used in the sense of the previously described criteria for the control of the torque-reducing action in the drive unit.

Other objects, advantages and novel features of the present invention will become apparent from the following detailed description of the invention when considered in conjunction with the accompanying drawings.

DETAILED DESCRIPTION OF THE DRAWINGS

Figure 1:
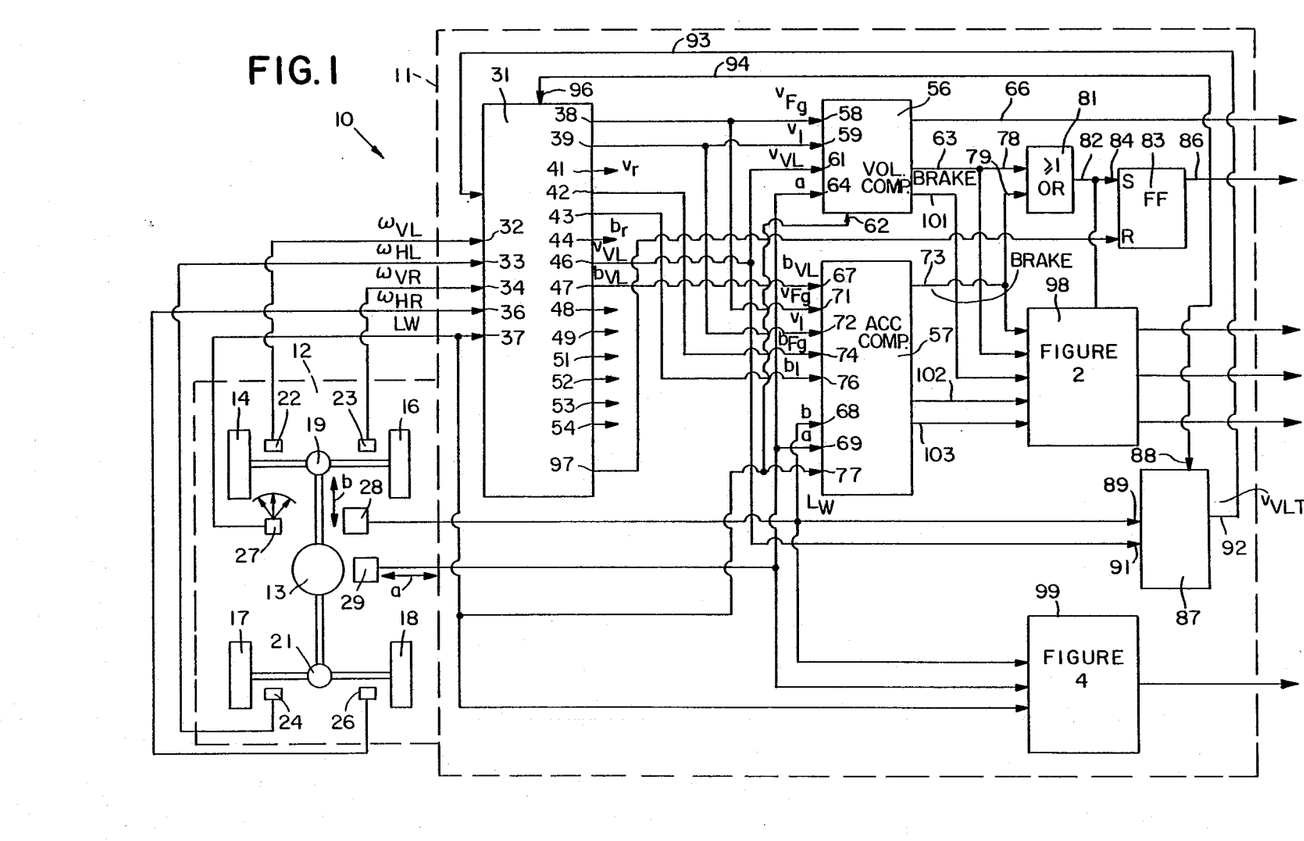
FIG. 1 shows a simplified block diagram of a propulsion control device in accordance with the invention.

The propulsion control device 10 represented in FIG. 1, to whose details reference will first be made, mainly by its electronic control unit 11 is intended for a motor vehicle 12 which has a balanced permanent all-wheel drive.

"Balanced" all-wheel drive here means that a balance gear, referred to below as a longitudinal differential 13, is provided for the distribution of the output torque of the drive unit (not shown for simplicity) of the motor vehicle 12 between the front axle and the rear axle and that a front axle differential 19 and a rear axle differential 21 are respectively provided for the distribution of driving torque between the front wheels 14 and 16 and between the rear wheels 17 and 18 of the motor vehicle 21. Differential locks are not provided.

The construction and function of the electronic control unit 11 is described below using a drive control (ASR function) acting on all the vehicle wheels 14, 16, 17 and 18 as an explanatory example. The propulsion control system operates on the principle that vehicle wheels tending to spin are retarded by activation of their wheel brakes such that their drive slip remains within a range of values compatible with both good vehicle acceleration and adequate driving stability. If the spin tendency remains after the wheel brakes of all the vehicle wheels 14, 16, 17 and 18 have been activated, the control unit 11 generates an output signal directing a setting element (electrical speed control) to reduce the power of the drive unit or its output torque.

The principle of propulsion control explained so far is known for both vehicles with signal axle drive and for vehicles with multi-axle drive.

Individually associated with each of the vehicle wheels 14, 16, 17 and 18 of vehicle 12 are wheel rotational speed sensors 22, 23, 24 and 26 which generate electrical output signals whose frequency or amplitude, depending on the type of sensors used, is a measure of the rotational frequencies $\omega_{VL}$, $\omega_{VR}$, $\omega_{HL}$, and $\omega_{HR}$ of the left front wheel 14, the right front wheel 16, the left rear wheel 17, and the right rear wheel 18 of the vehicle 12, respectively. The wheel velocities and accelerations are also indicated below by the subscripts VL, VR, HL and HR. The vehicle 12 is also provided with a curve travel sensor 27 which generates an electrical output signal which is different in a characteristic manner depending on whether the vehicle 12 travels along a left-hand or a right-hand curve. This curved travel sensor 27 is designed, as is indicated diagrammatically in FIG. 1 for example, as a steering angle sensor which generates DC signals of opposite polarity for alternative curved travel situations, their magnitude being a measure of the steering angle in each case.

The vehicle 12 is also equipped with a longitudinal acceleration sensor 28 which generates electrical output signals which are again different in a characteristic manner depending on whether the vehicle is accelerated or retarded in its longitudinal direction. For purposes of explanation, it is assumed that the longitudinal acceleration sensor 28 generates a plus voltage output signal (+b signal) when the vehicle is accelerated, a zero Volt output signal when the vehicle moves at constant velocity uniformly, and a negative voltage output signal when the vehicle 12 is retarded. The magnitudes of the output voltages of the longitudinal acceleration sensor 28 have to be proportional to the value of the vehicle acceleration (+b) or the vehicle retardation (−b).

In addition, the vehicle 12 is provided with a transverse acceleration sensor 29 which supplies an electrical output signal, for example a DC signal, whose magnitude is directly proportional to a transverse acceleration a acting on the vehicle 12 and which, for purposes of explanation, is assumed to be a plus voltage signal.

The electronic control unit 11 includes, as an input stage, a first processing unit 31, having four inputs 32, 33, 34 and 36 each of which receives one of the output signals from the wheel rotational velocity sensors 22, 23, 24 and 26 and a fifth input which receives the output signals from the curved travel sensor 27.

This first processing unit 31 and other processing units provided as sub-units of the control unit 11, are, for simplicity, only described with respect to their functions, from knowledge of which a specialist can realize these processing units using available electronic components.

The first processing unit 31 emits, at a first output port 38, an output signal $v_{Fg}$ which, as long as the control system has not responded, may be taken to be representative of the vehicle velocity $v_{Fg}$ in the case of travel in a straight line.

The signal corresponding to the lowest of the wheel peripheral velocities of the vehicle wheels 14, 16, 17 and 18 is used as the $v_{Fg}$ signal.

The first processing unit 31 emits, at a second output port 39, a signal $v_l$ signal which corresponds to the average value of the wheel peripheral velocities of the vehicle wheels 14 and 17 on the left-hand side of the vehicle.

The first processing unit 31 emits, at a third output port 41 a signal $v_r$ which corresponds to the average value of the wheel peripheral velocities of the vehicle wheels 16 and 18 on the right-hand side of the vehicle.

The first processing unit 31 emits signals at fourth, fifth and sixth output ports, which are generated by differentiation with respect to time of the Fg, the $v_l$ and the $v_r$ signals and which are, in consequence, a measure of the vehicle acceleration $b_{Fg}$ in the case of travel in a straight line and of the average values of $b_l$ and $b_r$ of the wheel peripheral accelerations of the vehicle wheels 14 and 17 on the left-hand side of the vehicle and of the vehicle wheels 16 and 18 on the right-hand side of the vehicle.

The first processing unit 31 emits signals at further output ports 46 and 47, $v_{VL}$ and $b_{VL}$, which represent the wheel peripheral velocity $v_{VL}$ and the wheel peripheral acceleration $b_{VL}$ of the left-hand front wheel 14. Pairs of output ports of the first processing unit 31 corresponding to the output ports 46 and 47 at which characteristic output signals are omitted for the wheel peripheral velocities $v_{VR}$, $v_{HL}$ and $v_{HL}$ and the wheel peripheral accelerations $b_{VR}$, $b_{HL}$ and $b_{HR}$ for the other vehicle wheels 16, 17 and 18 are indicated by 48, 49; 51, 52; 53, 54. Differentiation stages by means of which signals characteristic of the wheel peripheral accelerations are obtained from the signals characteristic of the wheel velocities are provided as part of the first processing unit 31.

Activation of the propulsion control system in the sense of applying a braking action to a particular vehicle wheel 14, 16, 17 and/or 18 tending to spin occurs whenever:

1. the drive slip of one or more of these vehicle wheels exceeds a threshold value considered to be critical in the particular driving situation, and/or 2. whenever, on at least one of the driven vehicle wheels 14, 16, 17 and/or 18, the value of the wheel peripheral acceleration $b_{VL}$, $b_{VR}$, $b_{HL}$ and/or $b_{HR}$ obtained by analysis from the output signal of the particular wheel rotational speed sensor 22, 23, 24 and/or 26 associated with the particular vehicle wheel is greater by an amount, considered critical for the particular driving situation, than the instantaneous value of the measured vehicle longitudinal acceleration b determined by means of the longitudinal acceleration sensor 28.

In order to check the two criteria mentioned previously, one velocity comparator 56 and one acceleration comparator 57 are provided as further processing units of the electronic control unit 11 for each of the vehicle wheels 14, 16, 17 and 18. For simplicity, only the comparators 56 and 57 provided for the left front wheel 14 of the vehicle 12 are shown and these are described in more detail below by means of their function as representatives of the comparators, not shown, provided for the other vehicle wheels 16, 17 and 18.

The $v_{Fg}$ output signal emitted at the first output port 38 of the first processing unit 31 is fed to a first input port 58 of the velocity comparator 56. This $v_{Fg}$ output signal can, as already mentioned above, be considered as representative of the vehicle velocity for the case of travel in a straight line.

The $v_l$ signal emitted at the second output port 59 of the first processing unit 31 is supplied to a second input port 59 of the velocity comparator 56. This signal, in the case of curved travel, represents the average value of the wheel peripheral velocities of the wheels 14 and 17 on the left-hand side of the vehicle.

The signal characteristic of the wheel peripheral velocity $v_{VL}$ of the left front wheel 14 emitted at the third output port 41 of the first processing unit 31 is fed to a third input port 61 of the velocity comparator 56. In addition, the velocity comparator 56 is controlled, via its control input 62, by the output signal of the curved travel sensor 27. By means of the output signal characteristics of straight line travel from the curved travel sensor 27, the velocity comparator 56 is directed into an operating mode in which the parameter $v_{Fg}(1+\lambda_g)$ is formed internally and compared with the wheel periphery velocity inputs $v_{VL}$ received at the third input 61.

If the vehicle 12 is travelling in a curve, recognizable by output signals from the curved travel sensor characteristic of the magnitude of the steering angle, this causes the velocity comparator 56 to be controlled into an operating mode in which the parameter $v_l(1+\lambda_l)$ is formed and compared with the velocity input $v_{VL}$.

If the result of this comparison is that $$v_{VL} \geq v_{Fg}(1+\lambda_g) \tag{1}$$

or $$v_{VL} \geq v_l(1+\lambda_l) \tag{2}$$

this is in each case assessed as an indication that there is excessive drive slip and the velocity comparator 56 emits a signal at its output port 63 to initiate the activation of the wheel brake of the left front wheel 14.

In the relationships of equations (1) and (2), threshold values of the drive slip for travel in a straight line or in a curve are given by a parameters $\lambda_g$ and $\lambda_l$. These parameters can be considered as being compatible with good driving stability and, typically have values between 0.1 and 0.3.

The parameters $\lambda_g$ and $\lambda_l$, to be taken into account in the comparative relationships of equations (1), and (2), are not specified as fixed values which are valid for all possible driving conditions of the vehicle 12. They are, on the contrary, modified at least as a function of the vehicle velocity ($v_{Fg}$ or $v_l$) and possibly also as a function of the transverse accelerations acting on the vehicle 12. Namely, the slip threshold $\lambda_g$ applicable to travel in a straight line is increased with increasing values of the vehicle velocity $v_{Fg}$. One possible algorithm by means of which the increase in the slip threshold $\lambda_g$ takes place is given by the following relationship (3):

$$\lambda_g = \lambda_{og} \cdot (1 + c \cdot (v_{Fg})/v_{max}) \quad (3)$$

In equation (3), a minimum value of the slip threshold for travel in a straight line is designated by $\lambda_{og}$. This applying to the situation where the vehicle is moving from rest ($v_{Fg}=0$) and having a typical value of 0.1. $v_{max}$ indicates the maximum velocity of the vehicle 12. c is a non-dimensional constant which has a typical value of 2. For the selected special explanatory example, the equation (3) gives an increase in the slip threshold $\lambda_g$ from 0.1 to 0.3 when the travelling velocity $v_{Fg}$ increases from zero to the maximum value of $v_{max}$.

The slip threshold value $\lambda_1$ applicable to the wheels 14 and 17 on the left-hand side of the vehicle in curved travel situations is modified in such a way that for low values of a transverse acceleration acting on the vehicle 12 but large values of the means velocity $v_1$ of the vehicle wheels 14 and 17 on the left-hand side of the vehicle, there is a higher slip threshold value $\lambda_1$ of, for example, 0.25. Whereas, in the case of smaller $v_1$ value, for example a value of 0.1. The essential consideration in the modification of the slip threshold $\lambda_1$ as a function of the velocity and transverse acceleration is reliable avoidance of vehicle "drift" from the selected curved path.

One possible algorithm by means of which an appropriate modification of the slip threshold value $\lambda_1$ for curved travel is obtained by processing the average velocity $v_1$ of the wheels 14 and 17 on the left-hand side of the vehicle and the wheel velocity $v_{VH}$ data, which are input at the input ports 59 and 61 of the velocity comparator 56, and the steering angle Lw data, which are input via the control input port 62 or another input port into the comparator 56, is given by the following relationship (4):

$$\lambda_1 = \lambda_{01} \cdot (1 + d \cdot (v_{1,r})/v_{max} - e \cdot (Lw)/Lw_{max} - f \cdot (v_1)/V_{max} \cdot (Lw)/Lw_{max}) \quad (4)$$

In this relationship, $\lambda_{01}$ designates an initial value of the slip threshold for curved path situations, which value corresponds to the limiting case where both the average value $v_1$ of the peripheral velocities of the vehicle wheels 14 and 17 on the left-hand side of the vehicle and the steering angle Lw have the value zero. A typical value of the constant $\lambda_{01}$ is 0.2. Lw and $Lw_{max}$ respectively designate the values which can be determined by means of the steering angle sensor 17 and the maximum value of the sensor. The constants d, e and f in equation (4) have the values 0.25, 0.5 and 0.5 in the particular design of the velocity comparator 56.

Analysis of the relationship (4) for the various possible pairs of values $v_1$, Lw shows that the slip threshold value $\lambda_1$ remains within a desirable range of values for all conceivable driving situations.

In a particular design, the velocity comparator 56 also has the capability of calculating a required value $a_s$ for the transverse acceleration acting on the vehicle 12, taking account of the vehicle geometry (track, wheel base) from the $v_1$ velocity and steering angle (Lw) data received via its input ports 59 and 61. By comparing this required value $a_s$ with the actual value a of the transverse acceleration acting in fact on the vehicle 12 (determined by means of the transverse acceleration sensor 29 and received at a further data input port 64 of the comparator 56) the velocity comparator 56 generates a signal at the second output port 66 whenever the required value $a_s$ of the transverse acceleration is greater than the actual value a by a specified amount $a_{s1}$. By means of this output signal, which is an indication that the vehicle 12 is drifting outwards when traveling in a curve, it is possible to initiate a torque reducing action in the driving unit of the vehicle 12.

The acceleration comparator 57, which, as part of the control unit 11, is associated with the left-hand front wheel 14 of the vehicle 12, receives at a first input port 67 the signal $b_{VL}$ emitted at the output port 47 of the first processing unit 31, which signal being a measure of the wheel peripheral acceleration $b_{VL}$ of the left front wheel 14. At a second input port 68, the acceleration comparator 57 receives the output signal of the acceleration sensor 28 as the input for the measured vehicle acceleration. At a third input port 69, the acceleration comparator 57 receives the output signal of the transverse acceleration sensor 29 of the vehicle 12 as the transverse acceleration input a. At a fourth input 71, the acceleration comparator 57 receives the vehicle velocity $v_{Fg}$ signal characteristic of travel in a straight line, which is emitted from the first output port 38 of the first processing unit 31. At a fifth input port 72, the acceleration comparator 57 receives, as a further input, the $v_1$ signal emitted from the second output port 39 of the first processing unit 31, which signal represents the average of the wheel peripheral velocities of the left-hand vehicle wheels 14 and 17 which, in a curved travel situation are assumed for comparison with the wheel peripheral velocities $v_{VL}$ and $v_{HL}$, to be representative of the vehicle velocity.

The objective of the acceleration comparator 57 is to generate a signal at its output port 73 initiating the activation of the wheel brake of the left-hand front wheel 14 whenever the wheel peripheral acceleration $b_{VL}$ determined for this wheel exceeds a value which is higher by a defined amount than the vehicle longitudinal acceleration. The $b_{Fg}$ signal emitted at the fourth output port 42 of the first processing unit 31 can, for example, be taken as a measure of the vehicle longitudinal acceleration, in the case of travel in a straight line, and this signal is fed to the acceleration comparator 57 at a sixth input port 74. In the case of travel in a curve, the $b_1$ output signal emitted at the fifth output port 43 of the first processing unit 31 is fed to a seventh input port 76 of the acceleration comparator 57.

So that the acceleration comparator 57 can "decide" whether the measured vehicle acceleration b has to be compared with the value $b_{Fg}$ of the acceleration in the case of travel in a straight line or with the value $b_1$, the average of the wheel peripheral accelerations of the left-hand vehicle wheels 14 and 17, valid for travel in a curve, the output signal of the curved travel sensor 27 giving the sense of the change to travel direction is also fed to the acceleration comparator 57 at an eighth input port 77.

In a particular preferred arrangement, the acceleration comparator 57 receives its second input port 68 the output signal b from the acceleration sensor 28, which is a direct measure of the vehicle acceleration b and this signal is used for assessment in the acceleration comparison.

In the simplest possible arrangement, the acceleration comparator 57 compares the wheel peripheral acceleration $b_{VL}$ with a value $X_v \cdot b$, where $X_v$ indicates a constant factor which has a typical value of 1.3. The acceleration comparator 57 generates the signal initiating the activation of the wheel brake of the left-hand front wheel on output port 73 whenever:

$$b_{VL} \geq X_v \cdot b \quad (5)$$

If the output signal of the acceleration comparator 57 is generated before the appearance of the output signal from the velocity comparator 56 characteristic of increased drive slip, this is an indication that the left front wheel 14 of the vehicle 12 is running "very rapidly" into increased drive slip which, in the range of high vehicle velocities and particularly when traveling in a curve, can lead to a dangerous situation.

In order to acheve sensitive response of the acceleration-dependent control at high vehicle velocities, provision is made in a further particular arrangement of the acceleration comparator 57 for the factor $X_V$ to be lowered as a function of the particular relevant vehicle velocity, $v_{Fg}$ or $v_1$, in accordance with the relationship:

$$X_v = X_O(1 - h \cdot (v_{Fg,1})/v_{max} \quad (6)$$

where $X_O$ indicates a constant with a typical value of 1.4 and h indicates a constant with a typical value of 0.15. In this arrangement of the acceleration comparator 57, the signal initiating the activation of the wheel brake of the left front wheel 14 is therefore emitted at its output port 73 whenever:

$$b_{BL} \geq X_v \cdot b \quad (5')$$

where $X_v$ is given by equation (6).

Since, as already mentioned, a tendency to spin of a vehicle wheel 14, 16, 17 and/or 18 because of the associated reduction in its side guidance power, particularly when there is a substantial transverse acceleration acting on the vehicle 12, represents a condition of potential danger, arrangements of the acceleration comparator 57 which give a reduction in the acceleration threshold $b_{Fg}$ or $b_1$ with increasing values of the transverse acceleration acting on the vehicle 12 (the activation of the wheel brake on the vehicle wheel tending to spin being initiated when they are exceeded) are particularly advantageous.

Taking account in this way of the transverse acceleration a takes place in a further, particular arrangement of the acceleration comparator 57 in that an output signal is initiated on output port 73 whenever:

$$b_{VL} + i \cdot a \geq X_v \cdot b \quad (5'')$$

where i designates a constant factor whose typical value is between 0.5 and 1.

It is also possible to take adequate account of the transverse acceleration a in the sense of lowering the response threshold of the acceleration-dependent control in an alternative arrangement of the acceleration comparator 57 in which the latter generates an output signal on output port 73 whenever:

$$\sqrt{(mb_R)^2 + (ka)^2} \geq X_v \cdot b \quad (5''')$$

where m and k designate non-dimensional constants which satisfy the relationship $m^2 + k^2 = 1$ and m has a minimum value of 0.8.

One each of the output signals emitted from the output ports 63 and 73 of the velocity comparator 56 and the acceleration comparator 57, respectively, are fed to the inputs 78 and 79 of a two input OR-gate 81.

When the propulsion control comes into operation at the left front wheel 14, i.e. with the application of a high level output signal at the output port 82 of the OR-gate 81, a flip-flop 83, whose setting input port 84 is connected to the output port 82 of OR-gate 81, is set to high output signal level at its Q output port 86.

As long as the high level output port signal is present at the Q output port 86 of the flip-flop 83, a fourth processing unit 87, designed as a velocity signal generator, remains activated. As soon as the output signal of the OR-gate 81 transfers to high signal level, i.e. when the propulsion control on the left front wheel 14 becomes effective this processing unit 87 generates an output signal which is used in the further course of the control as as velocity parameter $v_{VLT}$ representative of the wheel peripheral velocity of the left front wheel.

The output signal characteristic of $V_{LVT}$ emitted at the output port 92 of the velocity signal generator 87 is formed according to the relationship $$v_{VLT} = v_{VL}(t_o) + \int_{t_o}^{T_R} b \cdot dt \quad (7)$$

In the equation (7), $v_{VL}(t_o)$ designates the value of the wheel peripheral velocity of the left-hand front wheel 14 at the time $t_o$ when the control comes into operation. $T_R$ designates the time at which, as a consequence of control, equality is achieved between the measured value of the wheel peripheral velocity and the theoretical value of the wheel peripheral velocity corresponding to the equation (7). The measured wheel peripheral velocity $v_{VL}$ is again used in the formation of the parameters $v_{Fg}$ or $v_1$ and $v_r$ representative of the vehicle velocity.

The way in which the wheel velocity $v_{VLT}$ is updated, from the time $t_o$ when the control comes into operation is in accordance with the equation (7), which gives a wheel peripheral velocity which differs from the vehicle velocity by a maximum of $\lambda_g \cdot v_{Fg}$ in the case of travel in a stright line, or by $v_1 \cdot \lambda_1$ in the case of travel in a curve. Thus, the values to be inserted for the vehicle velocity $v_{Fg}$ or $v_1$ in the expression (1) and (2), which are used to carry out the velocity comparison in the velocity comparator 56, are a very good approximation to the actual vehicle velocity and, consequently, the control system always operates with good sensitivity.

The first processing unit 31 receives the $v_{VLT}$ output signal of the velocity signal generator 87 via an input line 93 and the output signal from the flip-flop 83 via a control line 94 at a control input port 96 of the first processing unit 31. When the output signal flip-flop 83 is high, the first processing unit 31 is directed into that operating mode in which the $v_{VLT}$ output signal of the velocity signal generator 87 is used for forming the vehicle velocity parameters $v_{Fg}$ or $v_1$. The transition ot "normal operation" of the first processing unit 31 takes place as soon as the parameter $v_{VL}$ determined from the putput signal $\omega_{VL}$ of the wheel rotational speed sensor 22 associated with the left front wheel 14 is equal to the velocity value $v_{VLT}$, the output parameter of the velocity signal generator 87. This is the case whenever the parameter $v_{VL}$, which is decreased in the course of the control procedure because of the action of the brake, starts to become smaller than the parameter $v_{VLT}$. As soon as this is the case, a high level signal by means of which the flip-flop 87 is reset, is emitted at a further output port 97 of the first processing unit 31.

Figure 2:
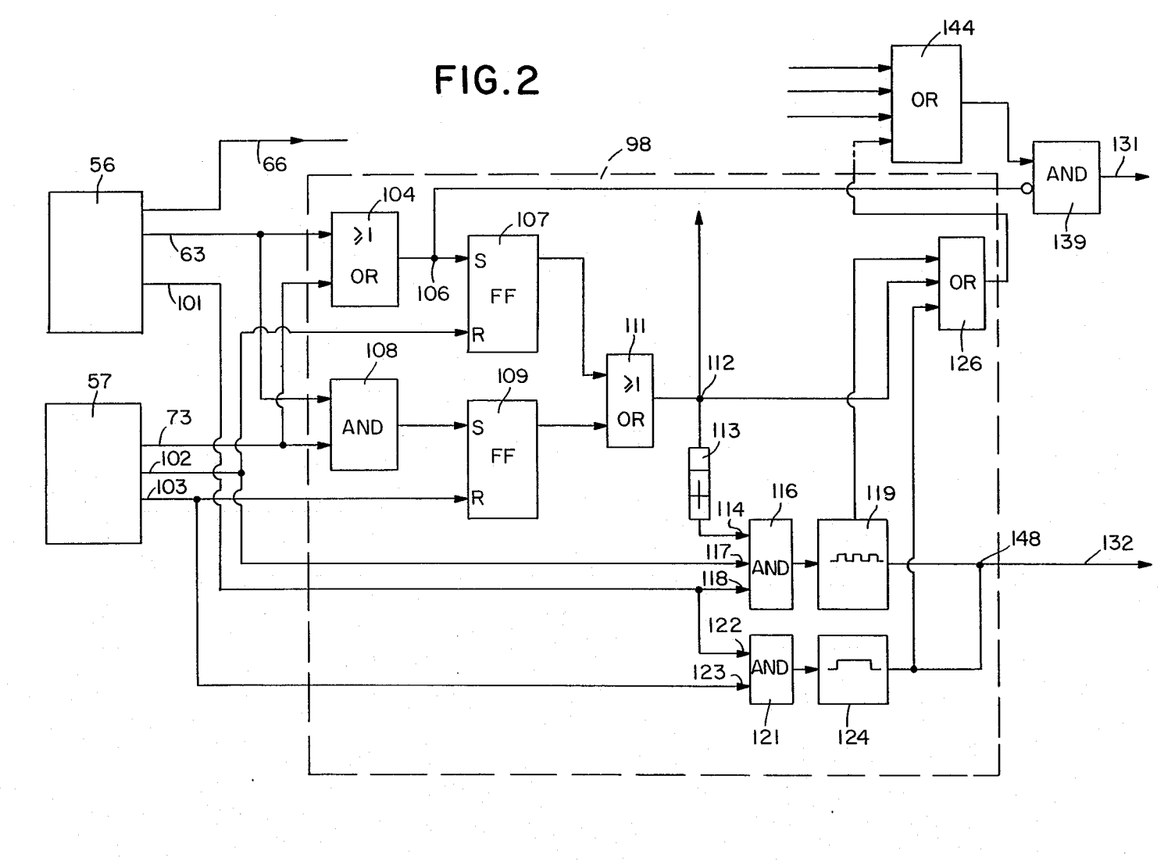
FIG. 2 shows block diagram of a processing unit, provided to control the braking action as part of the electronic control unit of the control device of FIG. 1, for controlling the pressure build-up, pressure maintenance and pressure reduction functions during control.
Figure 3:
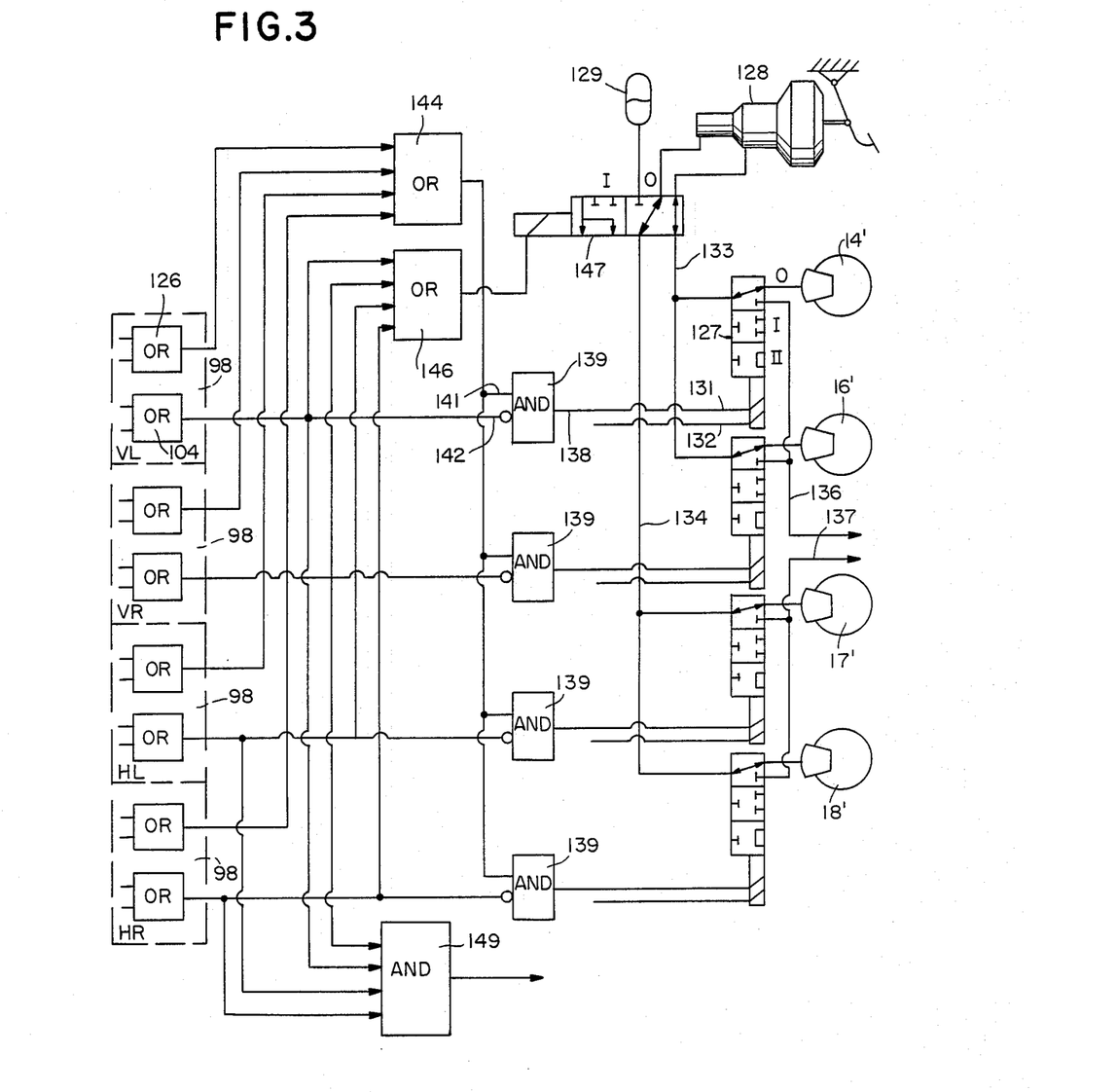
FIG. 3 shows a further block diagram of explaining the control of braking pressure control valves by means of the processing units of FIG. 2 individually associated with the vehicle wheels.
Figure 4:
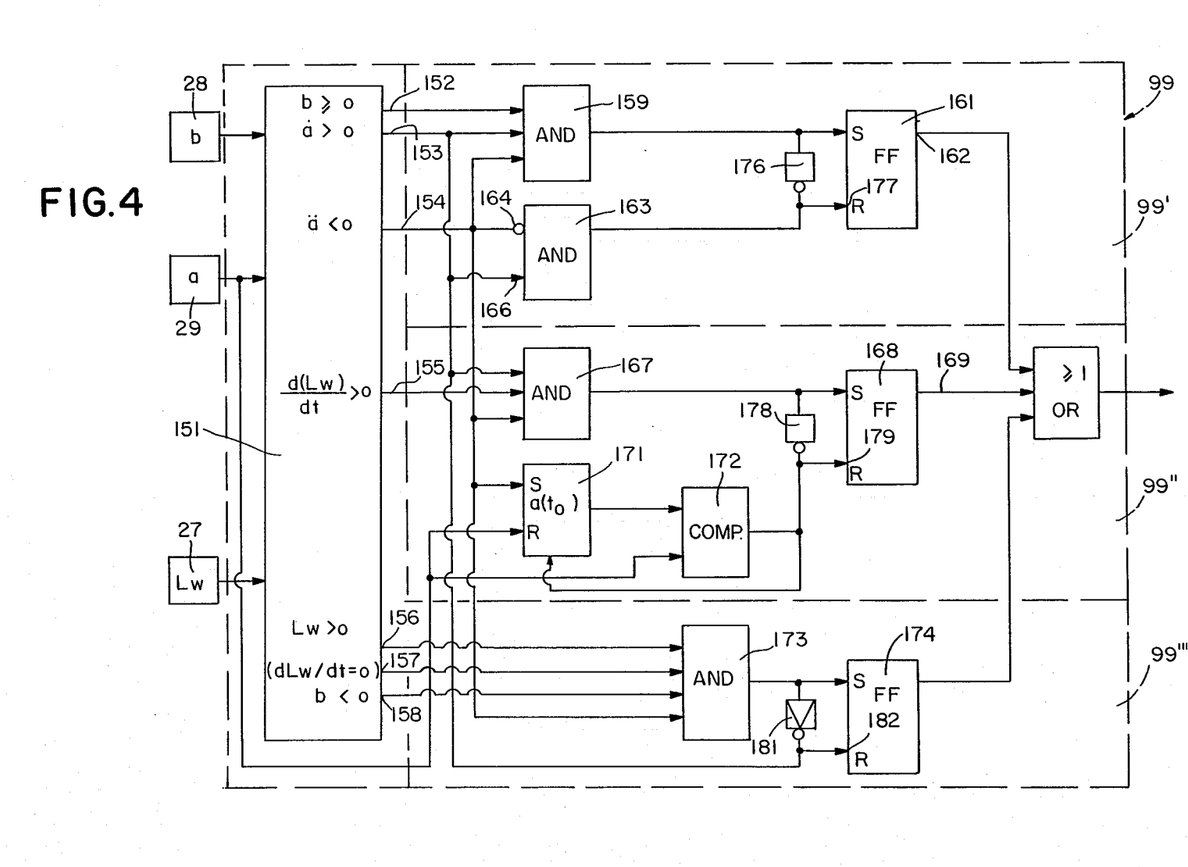
FIG. 4 shows a block diagram of a processing unit, provided as part of the electronic control unit of FIG. 1, for the control (as a function of the transverse acceleration) of torque-reducing actions in the drive unit of the vehicle.

Further processing units 98 and 99, indicated only as functional blocks in FIG. 1 and which are used for the purposes of the control system to control the action of the wheel brakes of the vehicle wheels to be controlled and the torque reducing action in the drive unit of the vehicle 12, are explained in more detailed below using FIGS. 2 to 4, the details of which will now be considered. Functional elements of the control unit 10 shown both in FIG. 1 and in FIGS. 2 to 4 are provided with the same reference signs in each case so that, to this extent, reference can be made to their previous description.

The velocity comparator 56, at whose first output port 63 a high level signal is emitted whenever, as alternatives, the equations (1) or (2) are satisfied, also has a third output port 101 at which a high level signal is emitted whenever and as long as the measured peripheral velocity $v_{VL}$, i.e. the velocity determined from the output signal of the wheel rotational speed sensor 22, of the left-hand front wheel 14 is greater than the vehicle velocity $v_{Fg}$ or $v_1$ in the respective cases of travel in a straight line or a curve.

In addition to its output 72, at which a high level signal is emitted depending on the design of the comparator 57, whenever the equations (5), (5'), (5'') or (5''') are satisfied, the acceleration comparator 57 has a second output port 102 and a third output port 103. At the second output port 102 of the acceleration comparator 57, a high level signal is emitted whenever and as long as the peripheral acceleration $b_{VL}$ determined from the output signal of the wheel velocity sensor 22 of the left-hand front wheel 14 is smaller than the vehicle acceleration b determined by means of the longitudinal acceleration sensor 28. At the third output port 103 of the acceleration comparator 57, a high level output signal is emitted whenever and as long as the left-hand front wheel 14 of the vehicle 12 is retarded, i.e. its peripheral acceleration $b_{VL}$ is less than zero.

The processing unit 98 provided for correct regulation of the control of the increase and reduction of the brake pressure in the wheel brake of the left-hand front wheel includes, as input stage, a first two-input front wheel includes, as input stage, a first two-input OR-gate 104 which emits a high level output signal at its output port 106 whenever and as long as a high level signal is present at the output 63 of the velocity comparator 56 and/or at the output port 73 of the acceleration comparator 57 which alternatively or jointly, indicate that the control system is responding on the basis of the equations (1), (2) or (5).

Whenever and as long as the high level output signal of this OR-gate 104 is present, brake pressure is increased in the wheel brake of the left-hand front wheel 14. By means of this high level output signal of the first OR-gate 104, a first flip-flop 107 is also set to high output signal level.

As a further input stage, the processing unit 98 includes a first two-input AND-gate 108 which generates a high level output signal whenever and as long as high level signals are present at both the first output port 63 of the velocity comparator 56 and the first output port 73 of the acceleration comparator 57, which show that at the vehicle wheel considered, the left-hand front wheel 14 in the present case, both the drive slip limit and the acceleration threshold at which the control system must respond have been exceeded.

A second flip-flop 109 can be set to high output signal level by means of the high level output signal from the first AND-gate 108. The output signals from the two flip-flops 107 and 109 are fed to a second two-input OR-gate 111, which then emits a high level output signal at its output port 112 whenever and as long as at least one of the two flip-flops 107 and 109 is set to high output signal level.

The first flip-flop 107 is reset to low output signal level by a high level output signal emitted at a second output port 102 of the acceleration comparator 57. This high signal shows that the acceleration $b_{VL}$ of the left-hand front wheel is smaller than the vehicle acceleration b measured by the longitudinal acceleration sensor 28.

The second flip-flop 109 is reset to low output signal level by a high level output signal emitted at the third output port 103 of the acceleration comparator 57. This high signal shows that the left-hand front wheel is being retarded.

The output 112 of the second OR-gate 111 is fed, via a fall-delay time element 113, which simultaneously provides an "extension" of the high level output signal from the OR-gate 111 by a defined short interval of time, to the first input port 114 of a three-input AND-gate 116. The second input port 117 of AND-gate 111 is connected to the second output port 102 of the acceleration comparator 57 and the third input port 118 is connected to the third output port 101 of the acceleration comparator 56. Once the control system has responded, the output signal of this three-input AND-gate 116 is therefore, a high level output signal whenever and as long as the wheel peripheral velocity $v_{VL}$, although smaller than the velocity threshold at which the control system responds, is larger than the vehicle velocity $v_{Fg}$ or, simultaneously, the wheel peripheral acceleration $b_{VL}$ is smaller than the measured vehicle acceleration b.

A pulse generator 119 is activated by high level output signal from AND-gate 116 for a definite time span of, for example, 50 ms. Within this time span, the pulse generator 119 generates a series of high level pulses during each of which a step-shaped reduction in pressure is effected in the wheel brake of the vehicle wheel which has to be controlled.

In addition, the processing unit 98 includes a second two-input AND-gate 121 whose first input port 122 is also connected to the third output port 101 of the velocity comparator 56 and whose second input port 123 is connected to the third output port 103 of the acceleration comparator 57. The output signal of the second two-input AND-gate 121 is therefore a high level output signal whenever and as long as the vehicle wheel subject to control is retarded although its wheel peripheral velocity is still larger than the vehicle velocity but smaller than the response threshold at which the velocity comparator 56 initiates the application of control. The high level output signal of the second two-input AND-gate 121 activates a further rectangular pulse generator 124 which, again for a time span of approximately 50 ms, emits a constant voltage pulse for whose duration without interruption brake pressure in the wheel brake subject to control is reduced. The duration of the pulse being so dimensioned that the pressure can be completely removed within the duration of the pulse.

Also provided as part of the processing unit 98 is a three-input OR-gate 126 whose three input ports respectively receive the output signal of the second OR-gate 111, a signal characteristic of the duration of activation of the pulse generator 119 and the output signal of the second pulse generator 124. The output signal of this three-input OR-gate 126 is a high level signal whenever and as long as the propulsion control is effective at the associated vehicle wheel. For a supplementary explanation of the interaction of the functional units 56, 57 and 98 provided as part of the control unit 10 for each of the vehicle wheels 14, 16, 17 and 18, reference is now made to the details of FIG. 3 in which a particular arrangement of a hydraulic unit suitable for effecting the propulsion control device 10 according to the invention is shown. It is here assumed that the vehicle 12 has a hydraulic double circuit brake installation in which the wheel brakes 14' and 16' of the front wheels 14 and 16 and the wheel brakes 17' and 18' of the rear wheels 17 and 18 are associated in a front axle brake circuit and a rear axle brake circuit, respectively. Each of the wheel brakes is allocated, as brake pressure control valve, a three-position magnetic valve 127 whose basic position 0 is the pressure increasing position in which brake pressure can be supplied to a particular wheel brake either by actuation of a braking device shown as a tandem main cylinder 128 or by connecting in a pressure reservoir 129 in the case of activated control.

By means of a high level signal present at a first control connection 131, the particular brake pressure control valve 127 can be directed into a shut-off position I in which the wheel brake 14' is shut-off from the brake line of the particular brake circuit and a brake pressure fed into the brake is maintained. By means of a signal present at a second control connection 132, alternatively or additional to one at the first control connection, the particular brake pressure control valve 127 is directed into a pressure reduction position II. In this position the wheel brake, although shut-off from the main brake line 133 or 134 of the front axle brake circuit or of the rear axle brake circuit, is connected so as to communicate with a drain line 136 or 137, via which pressure medium is drained from the particular wheel brake and can, if required, be pumped back into the pressure reservoir 129, in a manner not shown.

The pressure retaining control connection 131 of each brake pressure control valve 127 is connected to the outlet port 138 of a two-input AND-gate 139 which has a non-negated first input port 141 and a negated second input port 142.

At the first non-negated input port 141, the two-input AND-gate 139 receives the output signal of a four-input OR-gate 144 into which are fed the output signals of the OR-gate 126 of the four processing units 98 of the control unit 10. The output signal of this four-input OR-gate 144 is therefore a high level signal whenever the propulsion control is effective at one or more of the vehicle wheels.

At the negated input port 142, the particular two-input AND-gate 139 receives the output signal from the first OR-gate 104 of the particular processing unit 98. This output signal indicates that at least one of the response criteria for propulsion control is satisfied and that a brake action in the sense of braking the vehicle wheel tending to spin is necessary. OR-gate 146 receives of all the output signals of the first OR-gate 104 of all the processing units 98 present and generate a control signal 138. This control signal directs a switch-over magnetic valve 147 out of its basic position 0, in which the output pressure spaces of the tandem main cylinder 128 are connected to the particular main brake line 133 and 134 but are shut-off from the pressure reservoir 129, into an excited position I, in which the pressure reservoir 129 is connected to both main pressure lines 133 and 134 but the latter are shut-off from the tandem main cylinder 128.

The connection of the output signals of the OR-gates 104 and 126 of the processing units 98, brings the control system into action and the pressure reservoir 129 is connected to the main brake lines 133 and 134. Those brake pressure control valves 127, which are associated with vehicle wheels on which the control system does not have to be effective, are directed into their shut-off position I and only the brake pressure control valve or brake pressure control valves 127 which are associated with a vehicle wheel subject to control remain in their basic position 0 in which brake pressure can be connected to the particular wheel brake.

Because the pressure reduction control signals are repeated for short periods or present for a longer period, emitted at a common output 148 of the particular processing unit 98 (see FIGS. 1 and 2), and then are fed to the control connections 132 of the brake pressure control valves 127, one or more of the latter can be directed into their pressure reduction position II.

If the propulsion control system becomes effective at each vehicle wheel as an action by the brakes, this initiates in known manner a torque reducing action in the drive unit of the vehicle 12. In order to obtain an appropriate control signal, a four-input AND-gate 149, the output signals of the OR-gate 104 of the processing units 98 to which can be supplied as input signals is provided as shown in FIG. 3. It can also be desirable for the signal controlling the torque reducing action to be obtained from an AND connection of the output signals of the OR-gates 111 of the processing units 96.

For more detailed explanation of the further processing unit 99, which has to provide control to meet the requirements of the propulsion torque acting on the vehicle 12 in the case of travel in a curve, reference is now made to the details of FIG. 4.

The processing unit 99 includes three sub-units 99', 99" and 99''', which respond to different criteria and which, when one or more of these criteria are satisfied, initiate alternatively or in common a torque reducing action in the drive unit of the vehicle 12.

The processing unit 99 receives, as input parameters, both the vehicle acceleration (b) or deceleration (−b) determined by means of the longitudinal acceleration sensor 28, the transverse acceleration a determined by means of the transverse acceleration sensor 29 and the value of the steering angle Lw monitored by means of the curved travel sensor 27.

The processing unit 99 includes a signal preparation stage 151 which emits a high level signal at each one of a total of seven output ports 152 to 158 whenever and as long as 152 the vehicle acceleration $b \geqq 0$,
153 the change with respect to time $\dot{a} = da/dt \geqq 0$,
154 the second derivative with respect to time $\ddot{a} = -d\dot{a}/dt < 0$,
155 the change with respect to time $dLw/dt > 0$,
156 the steering angle $Lw > 0$,
157 the change with respect to time $dLw/dt = 0$ and
158 the vehicle longitudinal acceleration $b > 0$.

Various sub-combinations of these high level output signals from the signals preparation stage 151 are processed to control output signals by means of different criteria in the sub-units 99', 99" and 99'''. These output signals initiate a reduction of the output torque of the drive unit of the vehicle 12 to suit the situation under characteristically different curved travel conditions.

The sub-unit 99' includes a three-input AND-gate 159, each of whose three non-negated input ports are respectively connected to the first three output ports 152, 153 and 154 of the signal preparation stage 151, at which output ports the high level signals characteristic of $b \geq 0$, $\dot{a} \geq 0$ and $\ddot{a} < 0$ are emitted.

The application of the high level output signal characteristic of this signal combination sets the flip-flop 161 to high output signal level at its Q output port 162. The sub-unit 99' also includes a two-input AND-gate 163 which has a negated input port 164 and a non-negated input port 166. The negated input port 164 of the AND-gate 163 is connected to the third output port 154 and the non-negated input port 166 of the AND-gate 163 is connected to the second output port 153 of the signal preparation stage 151. The flip-flop 161 is reset to the low output signal level by a high level output signal of the two-input AND-gate 163 occurring later in time than the application of the high level output signal from the three-input AND-gate 159. The flip-flop 161 also has to be reset when the setting condition is not present, i.e. when the high level output signal from the three-input AND-gate 159 drops off via an invertor 176 connector to the reset input 177 of the flip-flop 161. As long as a high level output signal is present at the output port 162 of the flip-flop 161 of the sub-unit 99', an action to reduce the power or torque will be undertaken in the drive unit of the vehicle 12. This is the case if the vehicle 12 is accelerating in a curve ($b > 0$ and $\ddot{a} < 0$) but the increase $\ddot{a}$ of the change in transverse acceleration a is negative. This is the case if the positive change ($\dot{a} > 0$) starts to become less, i.e. the curve of a against time passes through a point of inflexion, which corresponds to a maximum in the change to transverse acceleration $\dot{a}$. The appearance of the output signal characteristic of $\ddot{a} > 0$ at the third output port 154 of the signal preparation stage 151 therefore makes it possible to "recognize" that the vehicle 12 has entered a condition in which the side guidance force of the vehicle wheels is no longer sufficient to hold the vehicle 12 on the curve radius specified by the steering deflection. After the output signal of the flip-flop 161 drops, engine power again increases corresponding to the expected value fed in by the driver. If the driver's input is too high, a further control cycle occurs and finally, in the ideal case, a steady state condition is achieved in which the vehicle 12 travels along the curve at constant velocity with a value of transverse acceleration a corresponding to a maximum possible side guidance force. The objective of the control system is to ensure sufficient driving stability in cases in which the driver feeds in an expected value of the vehicle velocity which is higher than that compatible with the road properties and driving situation.

This objective is also served by the further sub-units 99" and 99''' of the processing unit 99. The sub-unit 99" detects outward drift of the vehicle where the steering angle has to be increased ($dLw/dt > 0$) in a curve which becomes increasingly tighter so that an increase ($\dot{a} > 0$) appears in the transverse acceleration a, previously assumed to be constant, with the result that the parameter $\ddot{a}$ first becomes positive and then negative again as soon as the side guidance force of the vehicle wheels is no longer sufficient to "hold" the increasing transverse acceleration of the vehicle, because of the decreasing radius of the curve.

The second sub-unit 99" contains a three-input AND-gate 167 into which are fed, as input signals, the output signals emitted at the second, third and fourth output ports 153, 154 and 155 of the signal preparation stage 151.

By means of the high level output signal of AND-gate 167, which thus again indicates that the side guidance force of all the vehicle wheels is not sufficient to hold the vehicle 12 on the specified curve radius against the increasing transverse acceleration due to the increase in the steering angle, a flip-flop 168 is set to high output signal level at its output port 169 and a torque reducing action in the drive unit of the vehicle is again initiated by the high level output signal of this flip-flop 168.

The second sub-unit 99" also includes a storage element 171 which, when at time $t_0$, the output signal characteristic of $\ddot{a} > 0$ occurs at the third output port 154 of the signal analysis stage 151, stores the instantaneous value $a(t_0)$, applicable at this time, of the transverse acceleration determined by means of the transverse acceleration sensor 29. This value $a(t_0)$, which is also a measure of the maximum attainable side guidance force of the vehicle wheels, is compared in a transverse acceleration comparator 172 with the instanteous value of the transverse acceleration a from sensor 29.

As soon as the measured value of the transverse acceleration again exceeds a value which is smaller by a small specified difference amount $\Delta a$ than the stored value value $a(t_0)$, the transverse acceleration comparator 172 generates a high level output signal whose appearance resets the flip-flop 168 to the low output signal level and therefore terminates the torque reducing action in the drive unit of the vehicle 12.

In addition, the storage element 171 is again cancelled or reset, by the high level output signal of the comparator 172, into the operating condition in which it is ready to store a new transverse acceleration value $a(t_0)$.

So that the flip-flop 163 is also reset to terminate, as justified by the situation, the torque reducing action in the drive unit when the setting condition disappears, the output of the AND-gate 167 is connected via an inverter 178 to the reset input port 179 of the flip-flop 168.

The third sub-unit 99''' of the processing unit 99 has to recognize the situation where the vehicle, in non-accelerated curve travel and at constant steering deflection, starts to drift outwards because of a reduction in the adhesion coefficient between the roadway and at least one of the vehicle wheels and therefore has to react by reducing the engine output torque. With the extra conditions that the steering angle is kept constant and the vehicle travels at constant velocity, i.e. its longitudinal acceleration is zero, this situation is recognized by the appearance of a high level signal characteristic of $\ddot{a} > 0$ at the output port 154 of the signal preparation state 151 a four-input AND-gate 173 is provided as part of the third sub-unit 99''' for the logic connection of this high level signal with the output signals representing the auxiliary conditions emitted at the outputs 156, 157 and 158. A flip-flop 174 is set to high output signal level by the high level output signal of AND-gate 173, a torque-reducing action in the drive unit of the vehicle 12 being in turn controlled by the output signal of the flip-flop 174. This action is terminated as soon as the high level signal characteristic of an increase in the transverse acceleration is emitted at the output port 153 of the signal preparation stage 151, the flip-flop 174 being reset to the low output signal level by means of this high level signal.

So that the flip-flop 174 of the third sub-unit 99''' is also reset if the setting condition, high level output signal from the AND-gate 173, disappears, for example because the output signal of the signal preparation stage 151 characteristic of ä<0 falls off, the output of the AND-gate 173 is connected to the reset input 182 of the flip-flop 174 via an inverter 181.

The output signals of the sub-units 98 and 99 and of the velocity comparator 56, each of which individually initiates a torque-reducing action in the drive unit, are preferably fed by means of an OR-gate to a single control signal line by means of which a torque setting element, which can be realized in known manner, can be controlled.

It is obvious that the previously described propulsion control device for vehicles is suitable for vehicles with any given distribution of the drive torque between the front axle and the rear axle. The driving behavior of the vehicle, depending on whether a larger proportion of the total effective drive torque is used via the rear axle or via the front axle, then corresponds more to that of a rear axle driven vehicle or that of a front axle driven vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A propulsion control device of an all-wheel drive motor vehicle for controlling any wheel of the vehicle tending to spin by activating its wheel brake and, if all the vehicle wheels tend to spin, by initiating a torque reducing action in the drive unit of the vehicle, including individual wheel rotational speed sensors for each of the motor vehicle wheels; a longitudinal acceleration sensor for detecting the instantaneous vehicle acceleration b, an electronic control means for deriving velocity and acceleration or retardation signals by comparison of velocity and acceleration signals with a reference velocity representing the vehicle velocity increased by a threshold value of drive slip and an acceleration threshold value which is proportional to vehicle acceleration and is greater than vehicle acceleration b by a defined percentage, for deriving the control signals necessary for controlling the breaking action and the torque reducing action in the drive unit of the vehicle, and for integrating the b output signal of the longitudinal acceleration sensor and further comprising:

a permanently balanced all-wheel drive train;

for each vehicle wheel, a velocity comparator means for forming vehicle velocity parameter used for threshold value comparison by selecting the lowest peripheral wheel velocities as the reference velocity $v_{Ref}$ in the case of travel in a straight line and by selecting, for the different sides of the vehicle in the case of curved travel, the appropriate averages $v_l=(v_{VL}+v_{HL})/2$ and $v_r=(v_{VR}+v_{HR})\frac{1}{2}$ as the reference velocities for the particular side of the vehicle;

for each vehicle wheel, an acceleration comparator means for comparing measured values of the wheel accelerations with the value of the vehicle longitudinal acceleration b determined from the longitudinal acceleration sensor and, if the measured wheel acceleration $b_R$ is greater than the value of the vehicle longitudinal acceleration multiplied by a factor which is greater than unity, the acceleration comparator means generates an acceleration-dependent control signal controlling the braking action;

for each vehicle wheel, a velocity signal generator for generating, from the time of the application of the control signal to a respective vehicle wheel, a velocity signal $v_{RT}$ in accordance with the relationship $$v_{RT} = v_R(t_0) + \int_{t_0}^{T_R} b \cdot dt$$

in which the value of the measured wheel velocity at the time $t_0$ is indicated by $v_R(t_0)$ and the time at which the control signal for the respective vehicle wheel terminates is indicated by $T_R$, the parameter $v_{RT}$ being the wheel velocity in the formation of the reference velocity in the velocity comparator means for the duration of the activation of the control signal for the respective vehicle wheel;

said velocity comparator means being in a first operating mode in which the velocity parameter $v_{Fg}$ $(1+\lambda g)$, formed for comparison with the wheel velocity $v_p$, is increased with increasing vehicle velocity $v_{Fg}$ during travel in a straight line;

said velocity comparator means being in a second operating mode in which the parameters $v_l \cdot (1+\lambda_l)$ and $v_r \cdot (1+\lambda r)$ formed for comparison with the wheel velocities are reduced with increasing values of the transverse acceleration a acting on the vehicle, during travel in a curve, the vehicle including a transverse acceleration sensor for determining transverse acceleration a.

2. A device according to claim 1, wherein said velocity comparator means in said first operating mode increases the velocity parameter $v_{Fg}$, with which the particular wheel velocity $V_R$ is compared, according to the relationship $$v_{Fg}=v_F(1+\lambda_g)$$

with $$\lambda_g=\lambda_{0g}(1+c \cdot (v_F)/v_{max})$$

with $\lambda_{0g}$ being an initial value between 0.1 and 0.2, preferably 0.1; c being a non-dimensional constant whose value is between 1 and 2, preferably 2, and $v_{max}$ being the maximum vehicle velocity.

3. A device according to claim 2, wherein said velocity comparator means in said second operating mode forms the velocity comparison parameters $v_l$ and $v_r$, with which the peripheral velocities $v_{VL}$ and $v_{HL}$ of the left-hand side and $v_{VR}$ and $v_{HR}$ of the right-hand side vehicle wheels are compared, according to the relationship $$v_{l,r}=V_{0l,r}(1+\lambda_{l,r})$$

with $$\lambda_{l,r}=\lambda_{0l,r}(1-(e \cdot Lw)/LW_{max}+c' \cdot (v_{l,r})/v_{max})$$

with $\lambda_{0l}$ and $\lambda_{0r}$ being initial value of the slip thresholds to be applied during travel in a curve for the left-hand and right-hand vehicle wheels, with Lw being the steering angle deflection determined by a curved travel sensor, $Lw_{max}$ being its maximum value, and c' and e being non-dimensional constants whose typical values are between 0.1 and 0.25.

4. A device according to claim 3 wherein said velocity comparator means reduces the slip threshold $l_{1,r}$ applicable to travel in a curve according to the relationship $$\lambda_{1,r} = \lambda_{01,r}(1 - f \cdot (v_F \cdot Lw)/v_{max} \cdot Lw_{max})$$

with f being a non-dimensional constant with a typical value between 0.1 and 0.5.

5. Device according to claim 4, wherein said velocity comparator means changes the slip thresholds $\lambda_{1,r}$ during travel in a curve according to the relationship $$\lambda_1 = \lambda_{01} \cdot (1 + d \cdot (v_F)/v_{max} - e \cdot (Lw)/Lw_{max} - f \cdot (v_1)/V_{max} \cdot (Lw)/Lw_{max})$$

6. A device according to claim 3, wherein the acceleration comparator means forms the comparison parameter $X_v \cdot b$ used for comparison with the wheel peripheral acceleration $b_R$ from the relationship $$X_v \cdot b = X_0(1 - h \cdot (v_{Fg,1})/v_{max}) \cdot b$$

with $X_0$ being an initial value between 1.3 and 1.4, for low vehicle velocities and h being a non-dimensional constant whose typical values are between 0.15 and 0.3.

7. A device according to claim 6, wherein the acceleration comparator means, when $b_R$ $X_v \cdot b$ and travelling in a curve, forms $X_v$ from the relationship $$X_{1,r} = X_0(1 - h' \cdot (v_{1,r})/v_{max} - 1 \cdot a)$$

with h' and i being non-dimensional constants whose respective values have a maximum of 0.1 and lie between 0.5 and 1 and where $X_0$ has a minimum value of 1.3.

8. A device according to claim 6, wherein the acceleration-dependent control signal comes into action when:

$$\sqrt{(mb_R)^2 + (ka)^2} \geq X_v \cdot b$$

where k and m designate non-dimensional factors which satisfy the relationship $m^2 + k^2 = 1$ and where the minimum value of m is 0.8.

9. Device according to claim 1, wherein the electronic control means of the propulsion control device includes first means for generating a signal initiating a reduction of the output torque of the drive unit of the vehicle whenever and as long as the required value of a transverse acceleration $a_s$ determined from the vehicle velocity and the magnitude of a steering angle Lw determined by a curved travel sensor is greater by a specified threshold value $a_{s1}$ than the instantaneous value of the transverse acceleration a determined by the transverse acceleration sensor.

10. Device according to claim 9, wherein the electronic control means includes second means for generating a signal initiating the reduction of the output torque of the drive unit of the vehicle whenever, during the course of travel in a curve, the second differential coefficient with respect to time $\ddot{a} = d^2a/dt^2$ of the instantaneous value transverse acceleration a is smaller than zero and is generated for at least as long as the signal characteristic of $\ddot{a} \leq 0$ is present.

11. A device according to claim 10, wherein said second means terminates the control signal causing the torque reducing action in the drive unit if, after the signal characteristic of $\ddot{a} < 0$ has fallen off, the signal characteristic of $\dot{a} < 0$ reappears.

12. A device according to claim 11, wherein said second means includes a flip-flop having a set and reset input and whose input high level output signal is the control signal causing the torque-reducing action in the drive unit; a three-input AND-gate having as high level input signals, signals characteristic of $b > 0$, $\dot{a} > 0$ and $\ddot{a} < 0$ and a high output signal level connected to said set input of said flip-flop, and a two-input AND element which receives the $\ddot{a}$ signal at a negated input and the signal characteristic of $\dot{a} > 0$ at a non-negated input and whose output is connected to the reset input of said flip-flop.

13. A device according to claim 11, wherein said second means includes a flip-flop having set and reset inputs and whose high level output is the control signal initiating the torque reducing action in the drive unit of the vehicle, a four-input AND-gate, which receives as inputs high level signals the signals characteristic of $Lw > 0$, $dLw/dt = 0$, $b \leq 0$ and $\ddot{a} < 0$, where Lw is steering angle and whose output is connected to the set input of said flip-flop, said flip-flop being reset by a subsequently appearing signal characteristic of $\dot{a} \geq 0$ or by the falling off of the signal characteristic of $\ddot{a} < 0$.

14. A device according to claim 10, wherein said second means terminates the control signal causing the torque reducing action in the drive unit of the vehicle if, after the control system comes into action, the acceleration value a $(t_0)$ occurring when it comes into action is again exceeded by the instantaneous transverse acceleration a acting on the vehicle.

15. A device according to claim 14, wherein said second means includes a flip-flop having set and reset input and whose high level output signal is the control signal initiating the torque reducing action in the drive unit, three-input AND-gate which receives as inputs signals characteristic of $\dot{a} > 0$, $dLw/dt < 0$ where Lw is steering angle and $\ddot{a} < 0$ as high level signals and whose output is connected to the set input of said flip-flop and an acceleration comparator, which provides a high level signal to the reset input of said flip-flop whenever the transverse acceleration a acting on the vehicle is greater than the value a $(t_0)$ of the transverse acceleration a reduced by a minimum amount $\Delta a$ occuring on the appearance of the high level signal characteristic of the signal for $\ddot{a} < 0$.

16. A device according to claim 1, wherein the acceleration comparator means forms the comparison parameter $X_v \cdot b$ used for comparison with the wheel peripheral acceleration $b_R$ from the relationship $$X_v \cdot b = X_0(1 - h \cdot (v_{Fg})/v_{max}) \cdot b$$

with $X_0$ being an initial value between 1.3 and 1.4, for low vehicle velocities, $V_{max}$ being the maximum vehicle velocity and h being a non-dimensional constant whose typical values are between 0 and 0.3.

17. A device according to claim 16, wherein the acceleration-dependent control signal comes into action when:

$$\sqrt{(mb_R)^2 + (ka)^2} \geq X_v \cdot b$$

where k and m designate non-dimensional factors which satisfy the relationship $m^2 + k^2 = 1$ and where the minimum value of m is 0.8.

18. A device according to claim 1, wherein said velocity comparator means in said second operating mode forms the velocity comparison parameters $v_l$ and $v_r$, with which the peripheral velocities $v_{VL}$ and $v_{HL}$ of the left-hand side and $v_{VR}$ and $v_{HR}$ of the right-hand side vehicle wheels are compared, according to the relationship $$v_{l,r} = V_{0l,r}(1 + \lambda_{l,r})$$

with $$\lambda_{l,r} = \lambda_{0l,r}(1 - (e \cdot Lw)/Lw_{max} + c' \cdot (v_{1,r})/v_{max})$$

with $\lambda_{0l}$ and $\lambda_{0r}$ being initial value of the slip thresholds to be applied during travel in a curve for the left-hand and right-hand vehicle wheels, with Lw being the steering angle deflection determined by a curved travel sensor, $Lw_{max}$ being its maximum value, $V_{max}$ being the maximum vehicle velocity, and c' and e being non-dimensional constants whose typical values are between 0.1 and 0.25.

19. Device according to claim 1, wherein the electronic control means includes second means for generating a signal initiating the reduction of the output torque of the drive unit of the vehicle whenever, during the course of travel in a curve, the second differential coefficient with respect to time $\ddot{a} = d^2a/dt^2$ of the instantaneous value transverse acceleration a is smaller than zero and is generated for at least as long as the signal characteristic of $\ddot{a} < 0$ is present.

* * * * *